US006896441B1

(12) United States Patent
Champagne et al.

(10) Patent No.: US 6,896,441 B1
(45) Date of Patent: May 24, 2005

(54) AUTOMATED LATCHING DEVICE WITH ACTIVE DAMPING

(75) Inventors: Patrick Joseph Champagne, Portola Valley, CA (US); Kenneth Roy Lorell, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 51 days.

(21) Appl. No.: 10/379,982

(22) Filed: Mar. 4, 2003

Related U.S. Application Data

(60) Provisional application No. 60/402,907, filed on Aug. 14, 2002.

(51) Int. Cl.⁷ .................................................. B64G 1/64
(52) U.S. Cl. ...................................... 403/326; 244/161
(58) Field of Search ........................ 244/161; 403/92, 403/314, 326–330

(56) References Cited

U.S. PATENT DOCUMENTS

| | | | | |
|---|---|---|---|---|
| 3,666,216 A | * | 5/1972 | Nagy et al. | .............. 244/161 X |
| 3,809,002 A | * | 5/1974 | Nagy et al. | |
| 4,177,964 A | * | 12/1979 | Hujsak et al. | .............. 244/161 |
| 4,431,333 A | * | 2/1984 | Chandler | ................ 244/161 X |
| 4,500,057 A | * | 2/1985 | Duwelz | ...................... 244/161 |
| 4,900,078 A | | 2/1990 | Bloch | |
| 5,095,595 A | | 3/1992 | Stella et al. | |
| 5,364,046 A | * | 11/1994 | Dobbs et al. | ................. 244/161 |
| 6,126,115 A | * | 10/2000 | Carrier et al. | .......... 244/161 X |

FOREIGN PATENT DOCUMENTS

JP          04011600 A   *   1/1992

OTHER PUBLICATIONS

Schmidt, H., Latch Mechanism for the Space Telescope, Lockheed Missiles & Space Company, Inc., work sponsored by the NASA, Marshall Space Flight Center, Alabama.

* cited by examiner

*Primary Examiner*—Daniel P. Stodola
*Assistant Examiner*—Ryan M. Flandro
(74) *Attorney, Agent, or Firm*—McDermott Will & Emery LLP

(57) ABSTRACT

Embodiments of the present invention are directed to a compact and lightweight, automated latching device which includes a passive catch configured to be engaged with a motor-powered latch to form a mechanical connection between two structure in a precise and repeatable manner. An active damping mechanism is used to dissipate any vibrational energy that may be present in the latched structure. The apparatus may be used to precisely orient and attach a deployable element, usually of a space vehicle, to the main body of the vehicle. In one embodiment, a latching apparatus comprises a catch having a catch body and a probe connected to the catch body. A latch has a main housing and a grip mechanism movable relative to the main housing. The grip mechanism is configured to grip the probe and to be actuatable to pull the probe toward the latch. A damping member is coupled with the main housing of the latch, and is movable relative to the main housing of the latch toward the catch. The damping member is actuatable to exert a damping force against the catch body of the catch.

20 Claims, 6 Drawing Sheets

AUTOMATED LATCHING DEVICE WITH ACTIVE DAMPING

CROSS-REFERENCES TO RELATED APPLICATIONS

This application is based on and claims the benefit of U.S. Provisional Patent Application No. 60/402,907, filed Aug. 14, 2002, the entire disclosure of which is incorporated herein by reference.

BACKGROUND OF THE INVENTION

The present invention relates generally to latching devices and, more particularly, to a latching device having an active damping mechanism to dissipate vibrational energy.

Latching devices are used in space applications to deploy large structures such as antenna reflectors, solar arrays, mirrors, and the like. It is a challenge to provide precise and repeatable mechanical connection between two separate portions of a spacecraft or a spacecraft and another structure such that they behave as a unitary structure. In some cases, the buildup of vibrations in the latched structure presents additional problems.

BRIEF SUMMARY OF THE INVENTION

Embodiments of the present invention are directed to a compact and lightweight, automated latching device which includes a passive catch configured to be engaged with a motor-powered latch to form a mechanical connection between two structure in a precise and repeatable manner. An integrated active damping mechanism is used to dissipate any vibrational energy that may be present in the latched structure. The apparatus may be used to precisely orient and attach a deployable element, usually of a space vehicle, to the main body of the vehicle. In operation, the passive catch is brought into close proximity to the latch during the terminal phase of the deployment sequence. When the catch is sufficiently close to the latch, the latch mechanism is energized and the catch is automatically pulled into and captured by the latch and held in the correct mating position by a spring with a predetermined preload. In an exemplary embodiment, the mating surfaces of the latch and the catch are a spherical catch surface and a conical latch interface, so that the mated geometry is both correctly constrained and very precise.

As the catch becomes mated to the latch, an actuator (e.g., a coaxial linear voice coil motor) which is mounted to the outer body or damper housing of the latch is engaged with the catch. Because the catch contains an integral flexure that allows for a calibrated compliance in the axial direction between the deployed structure and the main body of the vehicle, the linear motor can provide an actuation force at the latched joint between the two bodies. This force, if controlled correctly, will act to dissipate any vibrational energy in the deployed structure. This technique is effective because the one or more latch apparatus that attach the deployed structure to the main body are typically the only or primary mechanical paths by which vibrations can be transmitted between the two bodies. Therefore, the energy absorbing feature within the latches is a direct way of reducing or eliminating mechanical energy originating in the main body.

In accordance with an aspect of the present invention, a latching apparatus comprises a catch having a catch body and a probe connected to the catch body. A latch has a main housing and a grip mechanism movable relative to the main housing. The grip mechanism is configured to grip the probe and to be actuatable to pull the probe toward the latch. A damping member is coupled with the main housing of the latch, and is movable relative to the main housing of the latch toward the catch. The damping member is actuatable to exert a damping force against the catch body of the catch.

In some embodiments, the damping member comprises an external damper housing which is disposed around the main housing of the latch and is coupled with the main housing by a preload ring biasing the damping member toward the catch. A linear motor is disposed between the damping member and the main housing of the latch to move the damping member relative to the main housing against the catch body. A transducer is coupled with the catch to measure a joining force between the catch and the latch, and the linear motor is tunable based on the joining force measured by the transducer. The catch includes a catch interface member connected to the catch housing. The catch interface member has a catch interface surface to contact a latch interface of the latch as the grip mechanism pulls the probe of the catch toward the latch. The catch interface surface is generally spherical and the latch interface is generally conical. The catch interface member and the probe are connected to the catch housing by axial flexural members disposed generally transverse to an axial direction along which the grip mechanism pulls the probe of the catch toward the latch. The catch is configured to be mounted to a structure to be latched onto the latch, and includes lateral flexural members to be connected between the catch body and the latched structure and provide lateral compliance between the latched structure and the latch.

In specific embodiments, the probe includes an enlarged head and the grip mechanism comprises a plurality of hooks configured to grip the enlarged head of the probe. The hooks are pivotally mounted on a slider which is movable relative to the main housing of the latch. The hooks are pivotable between an open position to clear the enlarged head of the probe during insertion of the probe into the latch and a closed position to grip the enlarged head of the probe. A motor-driven lead screw is connected to a spring which is connected to the slider. The spring is preloaded to apply a spring force on the slider in a direction to pull the probe into the latch. A latching system may comprise at least three latching apparatus having at least three catches and at least three latches, and the three catches are configured to be mounted to a structure to be latched onto the at least three latches.

In accordance with another aspect of the invention, a latching apparatus comprises a catch having a catch body and a catch interface member. A latch has a main housing including a latch interface and a latch mechanism to pull the catch interface member in an axial direction toward the latch interface to mate with the latch interface. A transducer is coupled with the catch to measure a joining force mating the catch interface member to the latch interface. A damping member is coupled with the main housing of the latch. The damping member is movable relative to the main housing of the latch toward the catch, and is actuatable to exert a damping force along the axial direction against the catch body of the catch. The damping force is adjustable based on the joining force measured by the transducer.

In some embodiments, a linear motor is disposed between the damping member and the main housing of the latch to move the damping member relative to the main housing against the catch body. The linear motor is tunable to adjust the damping force based on the joining force measured by the transducer.

In accordance with another aspect of the present invention, a latching apparatus comprises a catch having a catch body and a catch interface member. A latch has a main housing including a latch interface and a latch mechanism exerting a joining force to pull the catch interface member in an axial direction toward the latch interface to mate with the latch interface. A mechanism provides a preset axial compliance in the axial direction between the catch body of the catch and the main housing of the latch. A damping member is coupled with the main housing of the latch, and is movable relative to the main housing of the latch toward the catch. The damping member is actuatable to exert a damping force against the catch body of the catch.

In some embodiments, the catch is configured to be mounted to a structure to be latched onto the latch, and a mechanism provides a preset lateral compliance in a lateral plane perpendicular to the axial direction between the catch body and the main housing of the latch. The preset lateral compliance is substantially higher than the preset axial compliance to provide more compliance in the lateral plane between the catch body and the main housing of the latch than in the axial direction between the catch body and the main housing of the latch. The apparatus may include a mechanism for adjusting the damping force based on the joining force mating the catch interface member to the latch interface.

DETAILED DESCRIPTION OF THE INVENTION

Figure 1:
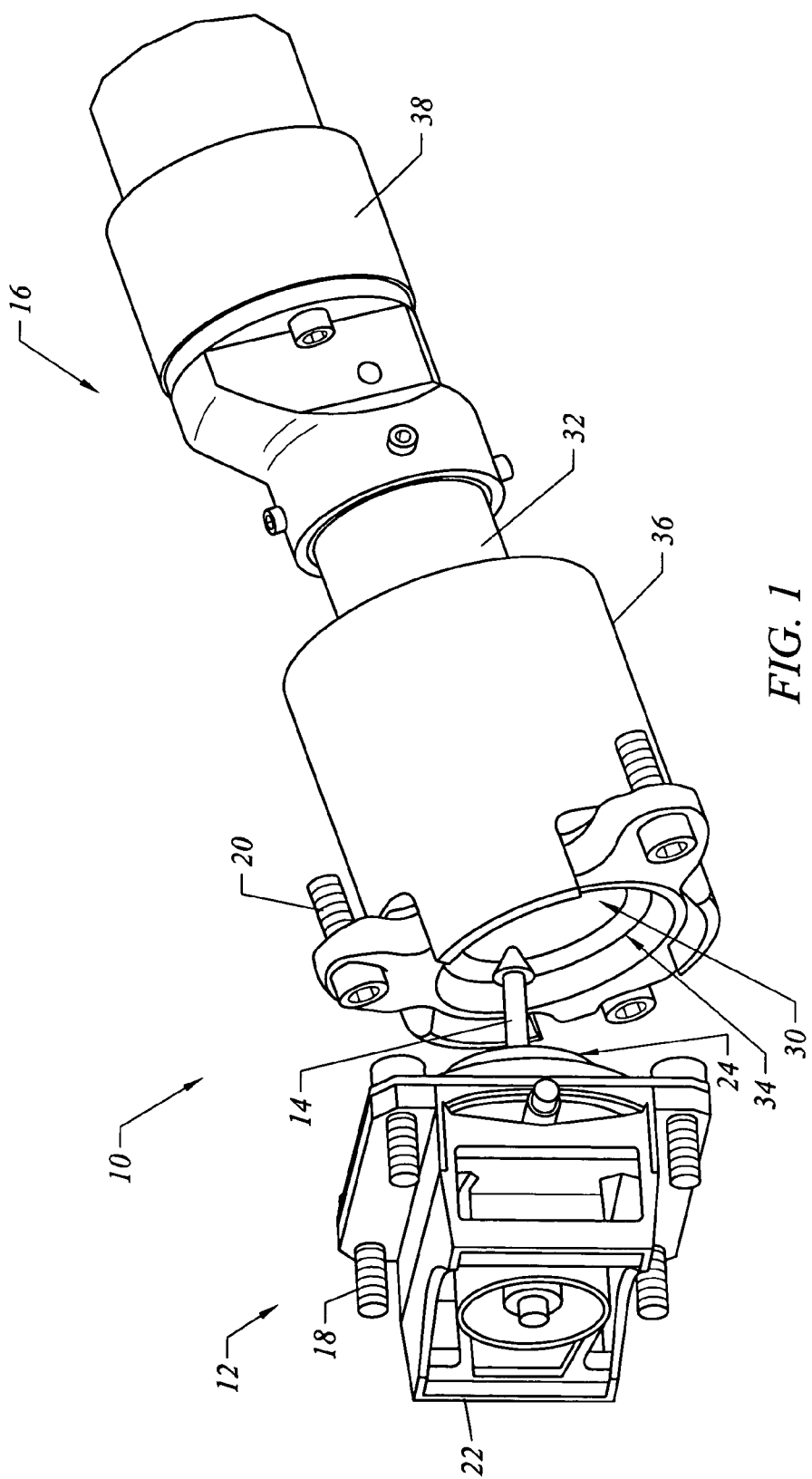
FIG. 1 is a perspective view of a latching device including a catch and a latch according to an embodiment of the present invention.

FIG. 1 shows a latching apparatus 10 which includes a catch 12 having a probe 14 that is to be gripped by a latch 16. The catch 12 and the latch 16 are coupled to separate structures that are to be connected together to act as a unitary structure. For example, fasteners 18 are used to attach the catch 12 to a first structure which may be a portion of a spacecraft, a structure to be deployed, or the like, and fasteners 20 are used to attach the latch 16 to a second structure which may be another portion of the spacecraft, a spacecraft, or the like. Typically, a plurality of latching apparatus 10 are used to connect the two structures. For example, three latching apparatus 10 are used provide a stable mounting mechanism.

Figure 2:
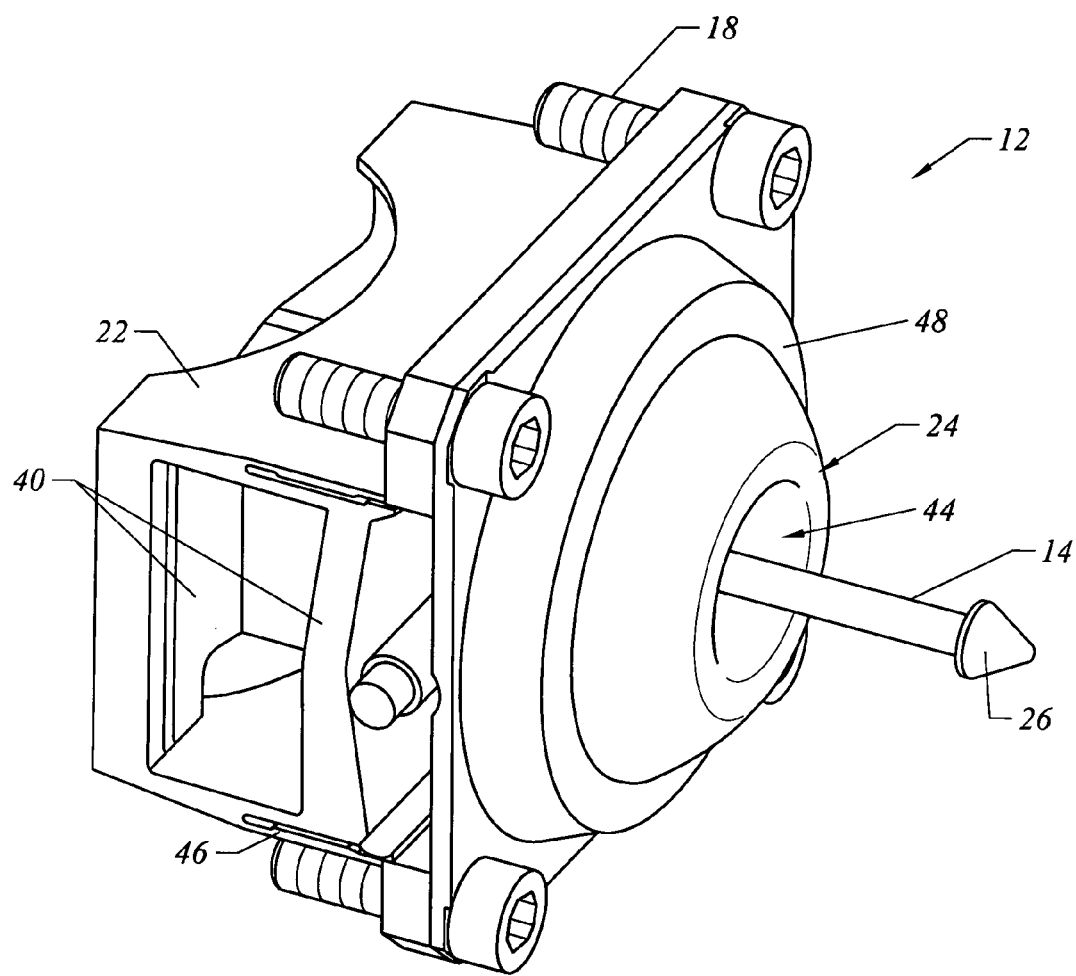
FIG. 2 is a perspective view of the catch in the latching device of FIG. 1.

As seen in FIGS. 1 and 2, the catch 12 includes a catch body 22 and a catch interface surface or catch surface 24 which is generally spherical in shape in the embodiment shown. The probe 14 extends through an axis of the catch body 22 and catch surface 24 toward the latch 16. The probe 14 typically has an enlarged head 26 which may be conical in shape. The latch 16 includes a cavity 30 in a main housing 32 for receiving the probe 14 of the catch 12. At the opening of the cavity 30 is a latch interface surface or latch interface 34 which is configured to mate with the catch surface 24 to provide a stable contact between the catch 12 and the latch 16. The latch interface 34 is generally conical in shape. A damper housing or damping member 36 is formed as an outer shell coupled to the main housing 32, and is part of the damping mechanism as discussed below. The latch 16 includes a lead screw that is disposed in the main housing 32 and is actuated by a motor 38 to pull the probe 14 into the cavity 30 to secure the connection between the catch 12 and the latch 16. The housing of the motor 38 is connected to the main housing 32. The motor 38 may be a conventional gear motor.

Figure 3:
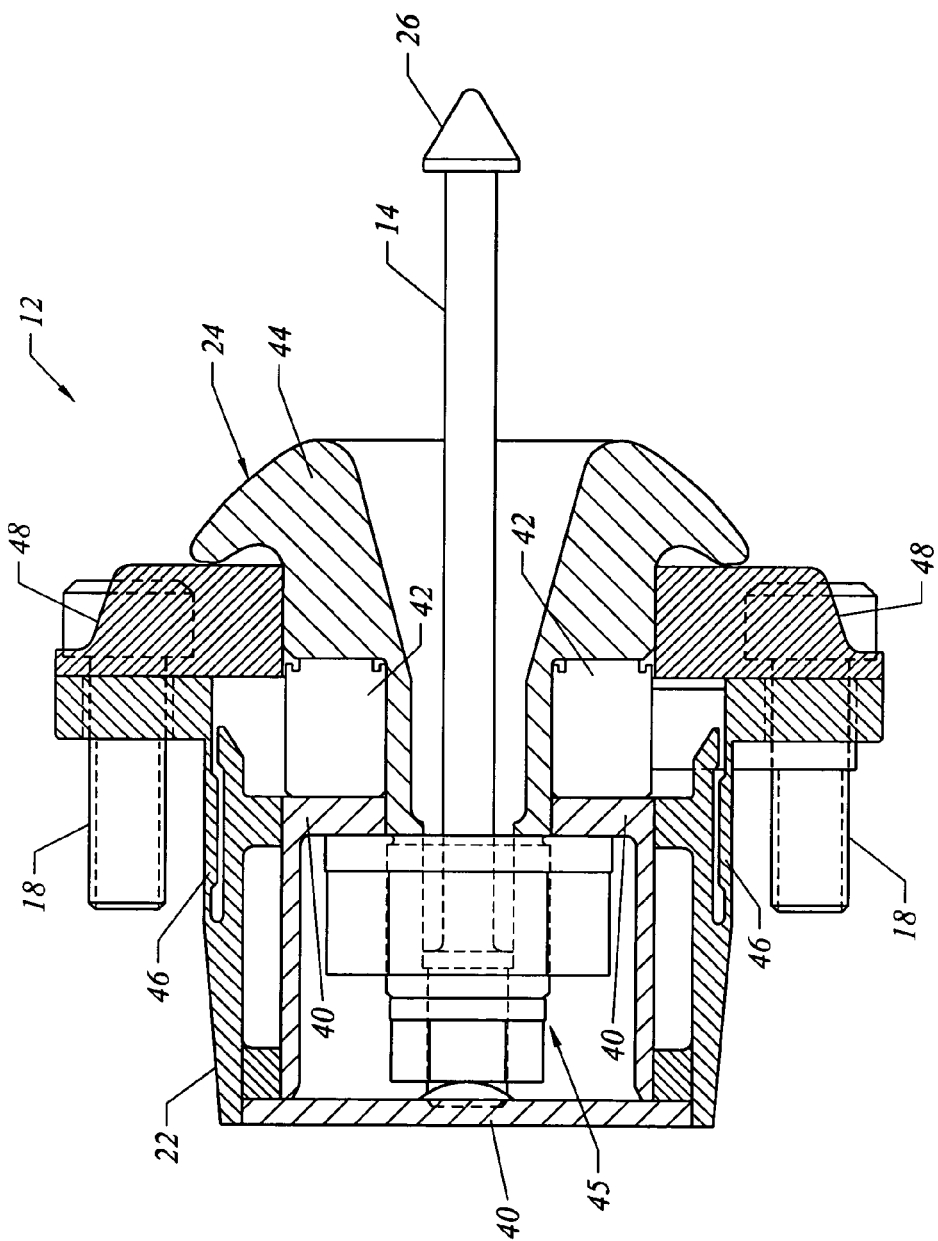
FIG. 3 is a partial cross-sectional view of the catch of FIGS. 1 and 2.

FIG. 3 shows additional details of the catch 12. The catch body 22 includes a plurality of axial flexural members 40 which extend generally in a transverse direction perpendicular to the axial direction of the probe 14 and are connected to the probe 14 in the center. As discussed below, the axial flexural members 40 provide controlled stiffness in the axial direction (or axial compliance) to assist in the stable coupling between the catch 12 and the latch 16. A force transducer 42 is connected between the axial flexural members 40 and the catch interface member 44 having the catch interface surface 24. The probe 14 is connected to the catch interface member 44 by a connecting member such as a threaded support 45. The catch body 22 further includes a plurality of lateral flexural members 46 which extend generally in the axial direction of the probe 14. The lateral flexural members 46 are substantially thinner than the axial flexural members 40, and are configured to provide lateral compliance for the catch 12 to facilitate centering of the catch interface surface 24 with respect to the latch interface 34 to ensure a good fit or mating connection therebetween as discussed in greater detail below. A contact ring or contact surface 48 is disposed generally around the catch interface member 44 to provide a spherical contact surface for mating to the damper housing 36 of the latch 16.

Figure 4:
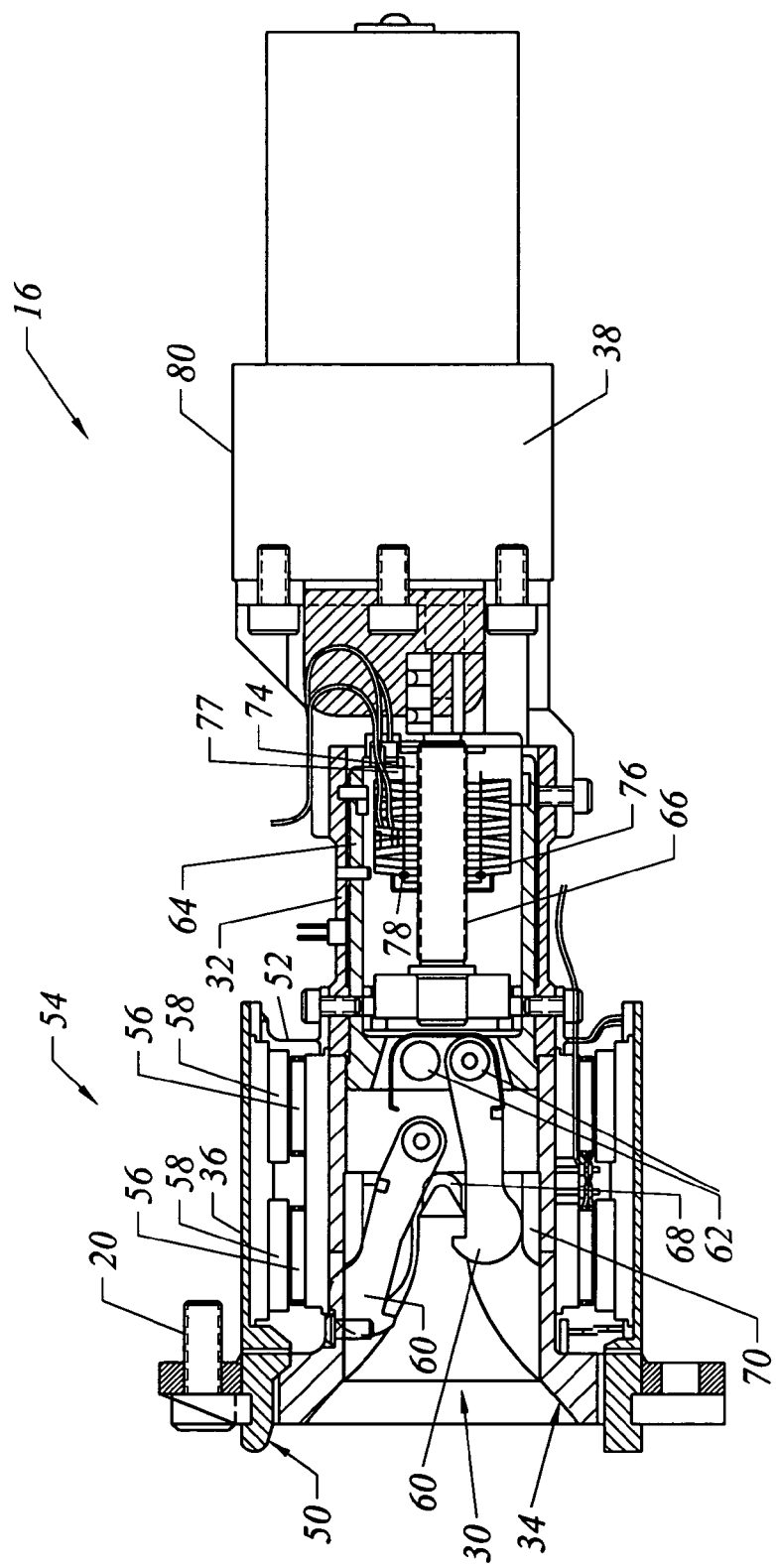
FIG. 4 is a partial cross-sectional view of the latch of FIG. 1.
Figure 5:
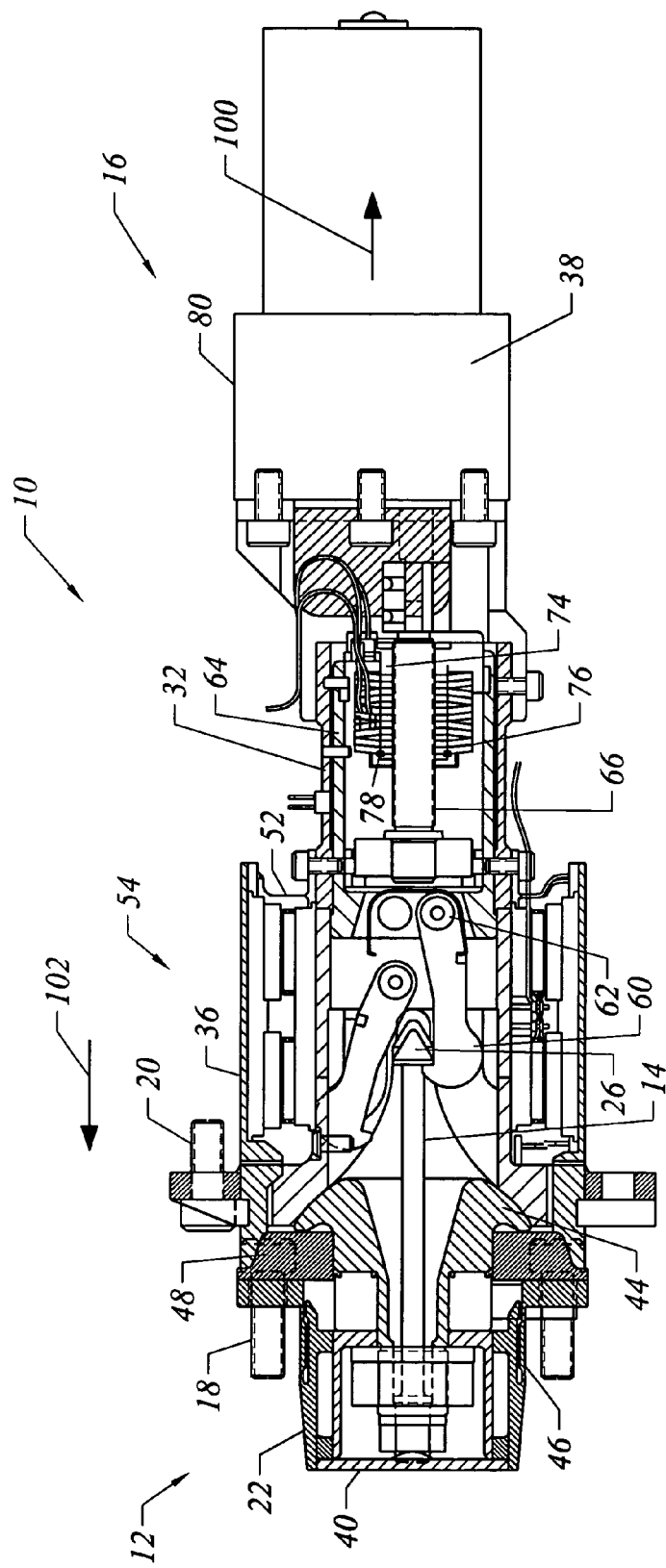
FIG. 5 is a partial cross-sectional view of the latching device of FIG. 1.

As seen in FIG. 4, the damper housing 36 includes a conical contact surface 50 for making contact with the contact ring 48 of the catch 12. The damper housing 36 is desirably connected to the main housing 32 by a preload ring 52 which biases the damper housing 36 toward the contact ring 48 of the catch 12 with respect to the main housing 32 of the latch 16 to ensure good contact between the damper contact surface 50 and the contact ring 48. Disposed between the main housing 32 and the damper housing 36 is a damper motor 54 that drives the damper housing 36 with respect to the main housing 32 for counteracting vibrations of the catch 12 and the first structure attached to the catch 12. FIG. 4 shows a linear motor 54 including magnets 58 mounted on the damper housing 36 and coils 56 mounted to the main housing 32.

FIG. 4 shows a pair of hooks or graspers 60 inside the cavity 30 for engaging with the enlarged head 26 of the probe 14 of the catch 12. The hooks 60 are pivotally mounted by pivots 62 on a slider 64, which is connected to a lead screw 66, that moves axially to drive the hooks 60 in the axial direction. The slider 64 is disposed inside the main housing 32. An inner cam 68 guides the inner surface of the hooks 60, and an outer cam 70 guides the outer surface of the hooks 60. As the hooks 60 move toward the opening of the cavity 30, the inner cam 68 pushes the hooks 60 apart to an open position to clear the enlarged head 26 of the probe 14. When the hooks 60 move away from the opening of the cavity 30, the outer cam 70 guides the hooks 60 inward to a closed position to grip and engage the enlarged head 26 of the probe 14. The hooks 60 move together between the open position and the closed position. FIG. 4 shows one hook in the open position and the other in the closed position for illustrative purposes only. The slider 64 on which the hooks 60 are mounted is driven by the motor 38 via the lead screw 66 to slide axially relative to the main housing 32. A spool 74 is threaded onto the lead screw 66 and carries a spring 76. The spring 76 is preloaded on the spool 74 to capture a cup 77 which is fixably attached to the slider 64. In the embodiment shown, the spring 76 is formed of a stack of curved disks connected together. As the lead screw 66 draws the spool 74 toward the motor 38, the captured cup 77 moves the slider 64 and the hooks 60 to bring the catch 12 into its final mated position. As the spool 74 continues to move toward the motor 38, the spring 76 is further compressed against the cup 77 to apply a spring force to the mated surface.

In operation, the passive catch 12 is brought toward the motor-powered latch 16 with the hooks 60 in the open position. The probe 14 enters the cavity 30 of the main housing 32, and is in position to be gripped by the hooks 60 when the catch surface 24 of the catch interface member 44 approaches the latch interface 34. The spherical catch surface 24 and conical latch interface 34 tend to self-center with respect to one another. The motor 38 drives the lead screw 66 to move the slider 64 and the hooks 60 in the direction 100 toward the motor 38 and away from the catch housing 22. The outer cam 70 guides the hooks 60 inward to the closed position to grip an enlarged end 26 of the probe 14, and pull the catch 12 toward the latch 16 to secure the connection therebetween. The lead screw 66 continues to drive the spool 74 to compress the spring 76 and exert a spring preload on the slider 64 toward the motor 38.

The active damping mechanism counteracts vibrational energy that may be present in the first structure attached to the catch 12. This is accomplished by activating the linear motor 54 to drive the damper housing 36 in the opposite direction 102 relative to the main housing 32. This pushes the damper housing 36 against the catch 12 at the contact between the contact surface 50 of the damper housing 36 and the contact ring 48 of the catch 12. The damper housing 36 is already preloaded by the preload ring 52 to bear against the contact ring 48, and the linear motor 54 can further ensure that a sufficient force is applied to counter any vibration. To ensure that the damping force applied by the linear motor 54 on the damper housing 36 against the contact ring 48 is correct, the damping force of the linear motor 54 is controlled based on measurements by one or more force transducers 42 in the catch 12. The force transducer(s) 42 measure(s) the non-constant component of force exerted between the latch 16, mounted on the main body, and the catch 12, mounted on the deployed body. If a vibration is being transmitted from the main body to the deployed body, it will be detected by the force transducer 42 as a variable force oscillating at a characteristic frequency. By commanding the linear motor 54 to apply an equal and opposite force from that sensed by the force transducer, the vibrations can be substantially damped or completely eliminated. The constant component of the force between the latch and catch should be above a preset minimum level to ensure an adequate and stable connection between the main body and the deployed body. The damping force provided by the linear motor 54 is always substantially lower than the preload joining force provided by the latch mechanism that holds the two bodies together. The joining force pulls the catch interface member 44 and the probe 14 towards the latch 16, while the damping force pushes the contact ring 48 and the catch body 22 away from the latch 16 with a force, which varies, according to the level of vibration force sensed by the force transducer 42. The axial flexural members 40 connect the catch body 22 to the catch interface member 44 and the probe 14, and are used to provide a controlled axial compliance between the catch structure and the deployed body.

Figure 6:
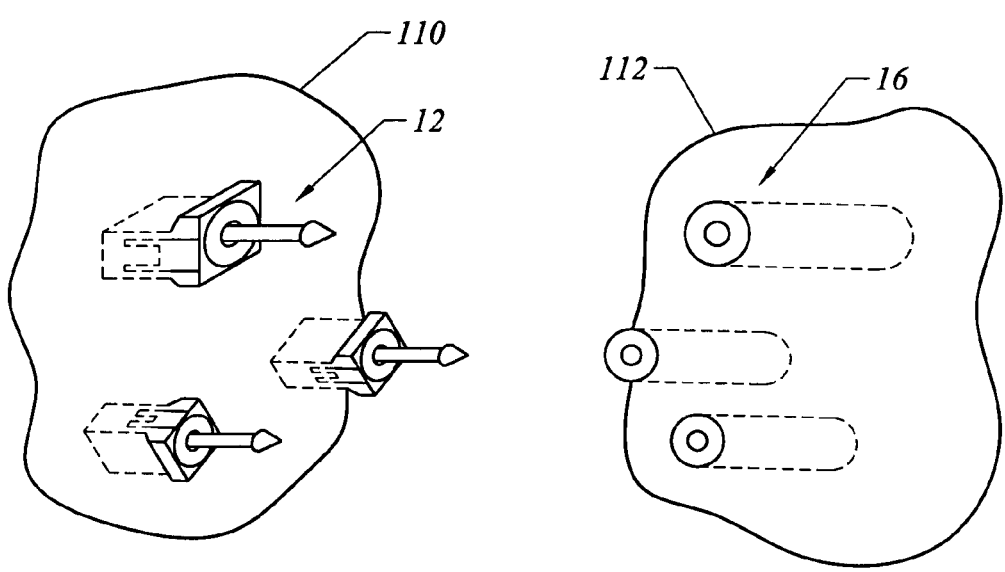
FIG. 6 is a simplified schematic view of a three-latch system according to an embodiment of the present invention.

FIG. 6 shows one example of a three-latch system for attaching a first structure 110 (e.g., a deployable structure) to a second structure 112 (e.g., a main body of a spacecraft). Three catch devices 12 are mounted to the first structure 110, and three corresponding latch devices 16 are mounted to the second structure 112. As the three catch devices 12 are connected to the three latch devices 16, some shifting in position may be desirable to achieve good contacts between the catch interface surfaces 24 and the latch interfaces 34. This accomplished by the lateral compliance provided by the lateral flexural members 46 in the catch devices 12. The lateral compliance allows the catch devices 12 to shift slightly relative to each other and precisely align to the three latches 16. In this way, the three-latch system provides a strong, stable connection (i.e., completely constrained) between the two structures 110, 112 with active damping via the latching apparatus 10. The latch system is very precise and repeatable, so that the final orientation of the latched structure 100 can be predicted very accurately. The three-latch system provides a quasi-kinematic mount with virtually non-existent hysteresis. Of course, other latching system may employ more than three latching apparatus 10 or arrange them differently from that shown in FIG. 6.

The above-described arrangements of apparatus and methods are merely illustrative of applications of the principles of this invention and many other embodiments and modifications may be made without departing from the spirit and scope of the invention as defined in the claims. For example, the various components such as the probe 14, catch interface member 44, and hooks 60 may have other shapes. The scope of the invention should, therefore, be determined not with reference to the above description, but instead should be determined with reference to the appended claims along with their full scope of equivalents.

What is claimed is:
1. A latching apparatus comprising:
  a catch having a catch body and a probe connected to the catch body;
  a latch having a main housing and a grip mechanism movable relative to the main housing, the grip mechanism being configured to grip the probe and to be actuatable to pull the probe toward the latch; and
  an active damping member coupled with the main housing of the latch, the active damping member being movable relative to the main housing of the latch toward the catch, the active damping member being actively feedback-controlled to exert a controlled force against the catch body of the catch, thereby providing dynamic structural damping to a structure attached to the catch.
2. The latching apparatus of claim 1 wherein the damping member comprises an external damper housing which is disposed around the main housing of the latch and is coupled with the main housing by a preload ring biasing the damping member toward the catch.
3. The latching apparatus of claim 1 further comprising a linear motor disposed between the damping member and the main housing of the latch to move the damping member relative to the main housing against the catch body.

4. The latching apparatus of claim 3 further comprising a transducer coupled with the catch to measure a joining force between the catch and the latch, and wherein the linear motor is tunable based on the joining force measured by the transducer.

5. The latching apparatus of claim 1 wherein the catch includes a catch interface member connected to the catch housing, the catch interface member having a catch interface surface to contact a latch interface of the latch as the grip mechanism pulls the probe of the catch toward the latch.

6. The latching apparatus of claim 5 wherein the catch interface surface is generally spherical and the latch interface is generally conical.

7. The latching apparatus of claim 5 wherein the catch interface member and the probe are connected to the catch housing by axial flexural members disposed generally transverse to an axial direction along which the grip mechanism pulls the probe of the catch toward the latch.

8. The latching apparatus of claim 1 wherein the catch is configured to be mounted to a structure to be latched onto the latch, the catch including lateral flexural members to be connected between the catch body and the latched structure and provide lateral compliance between the latched structure and the latch.

9. The latching apparatus of claim 1 wherein the probe includes an enlarged head and the grip mechanism comprises a plurality of hooks configured to grip the enlarged head of the probe.

10. The latching apparatus of claim 9 wherein the hooks are pivotally mounted on a slider which is movable relative to the main housing of the latch, the hooks being pivotable between an open position to clear the enlarged head of the probe during insertion of the probe into the latch and a closed position to grip the enlarged head of the probe.

11. The latching apparatus of claim 10 wherein a motor-driven lead screw is connected to a spring which is connected to the slider, the spring being preloaded to apply a spring force on the slider in a direction to pull the probe into the latch.

12. A latching system comprising at least three latching apparatus of claim 1 having at least three catches and at least three latches, wherein the three catches are configured to be mounted to a structure to be latched onto the at least three latches.

13. A latching apparatus comprising:
a catch having a catch body and a catch interface member;
a latch having a main housing including a latch interface and a latch mechanism to pull the catch interface member in an axial direction toward the latch interface to mate with the latch interface;
a transducer coupled with the catch to measure a joining force mating the catch interface member to the latch interface; and
a damping member coupled with the main housing of the latch, the damping member being movable relative to the main housing of the latch toward the catch, the damping member being actuatable to exert a damping force along the axial direction against the catch body of the catch, the damping force being adjustable based on the joining force measured by the transducer.

14. The latching apparatus of claim 13 further comprising a linear motor disposed between the damping member and the main housing of the latch to move the damping member relative to the main housing against the catch body, the linear motor being tunable to adjust the damping force based on the joining force measured by the transducer.

15. The latching apparatus of claim 13 wherein the catch interface surface is generally spherical and the latch interface is generally conical.

16. The latching apparatus of claim 13 wherein the catch interface member is connected to the catch housing by axial flexural members disposed generally transverse to the axial direction along which the latch mechanism pulls the catch interface member toward the latch.

17. A latching apparatus comprising:
a catch having a catch body and a catch interface member;
a latch having a main housing including a latch interface and a latch mechanism exerting a joining force to pull the catch interface member in an axial direction toward the latch interface to mate with the latch interface;
means for providing a preset axial compliance in the axial direction between the catch body of the catch and the main housing of the latch; and
an active a damping member coupled with the main housing of the latch, the active damping member being movable relative to the main housing of the latch toward the catch, the active damping member being actively feedback-controlled to exert a controlled force against the catch body of the catch, thereby providing dynamic structural damping to a structure attached to the catch.

18. The latching apparatus of claim 17 wherein the catch is configured to be mounted to a structure to be latched onto the latch, and further comprising means for providing a preset lateral compliance in a lateral plane perpendicular to the axial direction between the catch body and the main housing of the latch.

19. The latching apparatus of claim 18 wherein the preset lateral compliance is substantially higher than the preset axial compliance to provide more compliance in the lateral plane between the catch body and the main housing of the latch than in the axial direction between the catch body and the main housing of the latch.

20. The latching apparatus of claim 17 further comprising means for adjusting the damping force based on the joining force mating the catch interface member to the latch interface.

\* \* \* \* \*